219-121. SR 12-24-74 XR 3,857,041

United States Patent [19]

Spicer

[11] 3,857,041

[45] Dec. 24, 1974

[54] ELECTRON BEAM PATTERNING SYSTEM FOR USE IN PRODUCTION OF SEMICONDUCTOR DEVICES

[75] Inventor: Denis Frank Spicer, Putnoe, Bedford, England

[73] Assignee: Texas Instruments Incorporated, Dallas, Tex.

[22] Filed: Nov. 13, 1972

[21] Appl. No.: 306,069

Related U.S. Application Data

[62] Division of Ser. No. 51,257, June 30, 1970.

[30] Foreign Application Priority Data

July 3, 1969 Great Britain .................... 33555/69

[52] U.S. Cl. ........................... 250/492, 219/121 EB

[51] Int. Cl. ............................................ B23k 5/00

[58] Field of Search ............... 219/121 EM, 121 EB; 250/492 A

[56] References Cited

UNITED STATES PATENTS

| | | | |
|---|---|---|---|
| 3,519,788 | 7/1970 | Hatzakis | 250/492 |
| 3,644,700 | 2/1972 | Kruppa et al. | 250/492 |

OTHER PUBLICATIONS

"Electron Beam Exposure System for Integrated Circuits" by Y. Tarui et al., from Microelectronics and Reliability, Pergamon Press, Vol. 8, 1969, pages 101–111.

*Primary Examiner*—James W. Lawrence
*Assistant Examiner*—B. C. Anderson
*Attorney, Agent, or Firm*—Harold Levine; James T. Comfort; Richard L. Donaldson

[57] ABSTRACT

This Specification describes the method and apparatus for the exposure of sensitive resists by the use of closely scanned rasters described by a focussed electron beam. Variation in the line width is used to produce different raster shapes as required. A succession of similar rasters can be described spaced over a semiconductor wafer for the purpose of producing the patterning required for the production of a plurality of similar semiconductor devices on the single wafer. A technique for aligning the wafer with the scan of the electron beam is described using markers distributed over the surface of the wafer there being one marker for each small raster to be described by the beam from the wafer; one alignment system using a cathode-ray tube display of the images of the reference marker magnified and placed closed together on the screen so that errors in alignment can readily be detected.

4 Claims, 15 Drawing Figures

ELECTRON BEAM PATTERNING SYSTEM FOR USE IN PRODUCTION OF SEMICONDUCTOR DEVICES

This is a division of application Ser. No. 51,257, filed June 30, 1970.

This invention relates to electron-beam patterning of electron bombardment sensitive material and may usefully be employed, for example, in manufacture of semiconductor devices.

The production of a semiconductor device by conventional photoengraving techniques involves coating the surface of a wafer of semiconductor material with a layer of etch-resistant photosensitve material and exposing it to ultraviolet light through a suitably shaped mask. The areas of the photosensitive material on which the light falls acquire different properties from the other areas, so that photosensitive material can be selectively removed according to the shape of the mask, and a corresponding pattern exposed on the surface of the semiconductor wafer for etching or doping, for example.

The dimensions of a semiconductor device region that can be produced by such a method have a minimum value determined by diffraction effects: in practice, the minimum value is about 2.5 microns. This minimum limits the frequency ranges over which the resultant semiconductor devices can be operated and also the number of devices that can be packed into a given area on a single semiconductor wafer, so that it is desirable to be able to produce devices having dimensions less than the minimum that can be achieved by the photoengraving technique outlined above.

Several successive exposure and etching steps are generally carried out in the production of a semiconductor device and it is necessary to be able to position accurately the semiconductor on which the device is being fabricated to ensure that device regions produced by successive steps are correctly positioned relative to each other.

It is one object of the invention to provide a method of producing more accurately resolved patterns of exposed sensitive material by the use of an electron beam. The patterns may be used in the manufacture of semiconductor devices.

It is an alternative object of the invention to provide an improved method of making semiconductor devices including repeated-step pattern exposure of an electron sensitive material on a semiconductor wafer by means of an electron beam, including aligning the wafer with the beam to locate the step positions of the beam at desired points on the wafer.

According to one aspect of the invention there is provided a method of exposing an electron bombardment sensitive resist comprising forming an electron beam focussed on the resist and causing the beam to describe a closely scanned raster over each area to be exposed.

According to another aspect of the invention there is provided a method of making semiconductor devices including repeated-step pattern exposure of sensitive material on a semiconductor wafer by means of an electron beam, including aligning the wafer with the beam to locate predetermined step positions of the beam at desired points on the wafer which is provided with a reference array comprising a plurality of alignment markings, respectively associated with the desired points on the wafer including the steps of:

firstly, approximately aligning the wafer with the beam and then deriving signals indicating the displacement of the step positions of the beam provided by a repeated-step scan waveform from the associated alignment marks, in response to scanning the set of alignment marks by the beam in a manner bearing known relationship to the repeated-step scan and adjusting the relative positions of the wafer and step positions of the beam in dependence upon the signals so as to obtain the desired alignment.

The approximate alignment may, for example, be carried out by forming a straight edge of the wafer and placing the wafer against two abutments at right angles with the straight edge lying along one abutment, the two abutments being on a mechanical stage which is settable to a reference position to provide the desired approximate alignment. Alternatively a reference grid can be provided on the wafer and positioning the wafer by visual observation through an optical microscope, the reference grid being defined in the semiconductor wafer, for example, by a conventional photomasking and etching process.

In one example the alignment markings may be formed in the surface of the wafer and the signals corresponding to the alignment markings derived by secondary electron emission from the wafer in response to the scanning electron beam.

In another example, the signals corresponding to the alignment markings may be derived by making the alignment markings in the form of lines of semiconductor material of the opposite conductivity type to the main body of the semiconductor wafer; applying an electric potential between the alignment markings and the semiconductor wafer to reverse bias the junction between the alignment markings and the semiconductor wafer and scanning the wafer with the electron beam in the region of the alignment grid while deriving an output signal in response to the reverse current across the junction. Peak values occur in the reverse current across the junction between the alignment markings and the semiconductor wafer on each occasion that the scanning electron beam traverses such a junction and provide an indication of the position of the lines of the alignment markings which permits accurate alignment of the electron beam.

The alignment markings may be in the form of a smaller reference grid of intersecting lines based on two intersecting lines of a larger grid used for approximate alignment, of the optical type described above.

According to a further aspect of the invention there is provided apparatus for exposing an electron beam bombardment sensitive resist comprising means for forming an electron beam focussed on the resist, means for generating deflection signals, means for deflecting the electron beam in response to the deflection signals, the deflection signals being such as to cause the beam to scan a closely spaced raster, means for producing reference signals representing the limits of an area of resist to be exposed, means for comparing the deflection signals with the reference signals, and means responsive to the comparing means for preventing exposure of the resist outside the area to be scanned. In one embodiment, the electron beam scan is controlled by reference signals produced by a pattern generator, the reference signals representing coordinates of the limits of an area of the resist to be exposed and confining the travel of the electron beam within the limits of that area of the resist. When the required area of the resist has been scanned and exposed, the pattern generator produces a signal which blanks off the electron beam to prevent exposure of the resist outside the desired area. When areas of the resist are being exposed using a step and repeat pattern, the beam blanking signals are effective during the stepping periods and may be continued for a short time after each stepping movement has been completed, before scanning of a fresh area of resist is commenced.

To assist in the alignment of the wafer with the scanning raster of the electron beam, a display means, such as a cathode ray picture tube, may be provided fed by a signal derived from the scanning by the electron beam of reference marks on the wafer, the display means being such that representations of the reference marks are displayed in predetermined relative positions when the wafer is correctly aligned. The signal is preferably derived by means of a channel electron multiplier responsive to secondary emission from the wafer.

Instead of displaying the reference marks automatic means can be provided for effecting the alignment of the wafer relative to the scan of the electron beam.

Therefore, yet another aspect of the invention provides apparatus for exposing a plurality of similar patterns having a plurality of reference marks, each pattern being similarly disposed relative to a respective reference mark on an electron bombardment sensitive resist comprising means for producing an electron beam focussed on the resist, means for deflecting the electron beam to describe the required patterns on the resist, means for deriving electrical signals in response to the scanning of the reference marks by the electron beam, and means responsive to the electrical signals and the deflecting means for enabling the reference marks on the resist and the scanning of the electron beam to be brought into a particular relationship.

Preferably the amplitude of the scanning waveform is controlled so as to provide the desired pattern of an exposed resist, although in an alternative arrangement the scan amplitude is kept constant and the electron beam blanked and unblanked so that only the required parts of the beam trace are effective on the resist.

The invention also provides a semiconductor device made by the method or apparatus described above, and it has been found possible, by employment of the invention, to delineate semiconductor device regions having a width less than 1 micron, with widths of about 0.1 – 0.25 microns being obtainable.

Electron beam exposure of electron bombardment-sensitive resists, in accordance with the invention, can be employed in defining metallization interconnection patterns on semiconductor wafer.

Some of the advantages arising from the invention are that patterns of desired geometries, including small dimensioned and complex geometries, can be delineated in, and apertures of very small dimensions — e.g., about 1 micron and less — can be formed in an electron sensitive resist layer, and correspondingly shaped and dimensioned patterns and apertures can then be formed in material (e.g., an oxide or other protective surface coating on a substrate, or in a metallization layer) underlying the resist layer by use of suitable techniques, e.g., chemical etching or so-called "argon-ion etching." By use of such techniques, semiconductor devices having very small geometry, accurately defined active regions can be produced, for example, microwave transistors having micron geometries, e.g., emitter widths of about 1 micron or less and FET devices having gate widths of about 1 micron or less; active regions having widths of about 0.1 to 0.25 microns are obtainable by employment of the invention. The increased resolution available by employment of the invention also offers the possibility of increasing the logic density of LSI and MSI systems by about two orders of magnitude.

Further, computer control of the electron beam scanning pattern may be used to obtain rapid delineation of extremely complex and small geometry patterns, without use of a mask, for delineating the active regions of circuit elements and for delineating contact areas and metallization interconnection patterns in integrated circuit manufacture, leading to significant manufacturing economies in production of MSI and LSI devices as well as making feasible economic production of such devices on a custom design basis. For example, while generation of the necessary mask sets for production of integrated circuits using conventional photo-engraving techniques typically may take several weeks, the present invention offers the possibility of generating the required electron beam scanning pattern by writing an appropriate computer program which may take about an hour or so. Also, changes in the required geometries or metallization pattern which would require generation of one or more complete masks in the conventional process, merely requires amendment of the computer program for controlling the electron beam scanning pattern thereby leading to an increased degree of freedom in integrated circuit design.

In order that the invention may be fully understood and readily carried into effect it will now be described with reference to the accompanying drawings of which:

Figure 1:
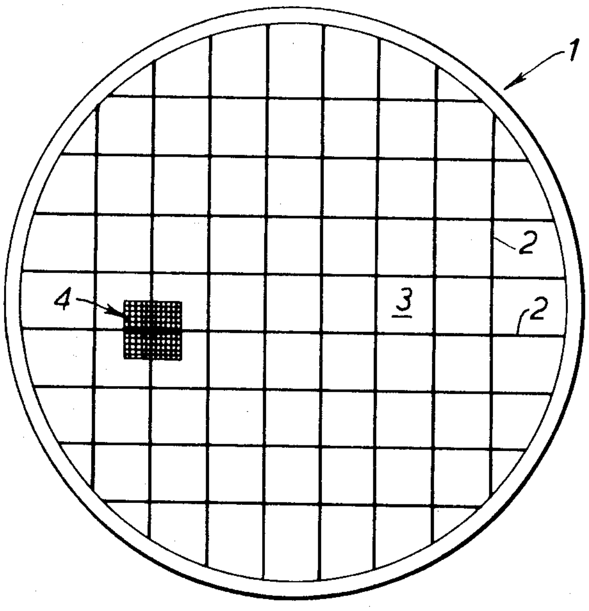
FIG. 1 shows the surface of a silicon wafer during the production of an alignment grid thereon in accordance with one example of the invention.
Figure 2:
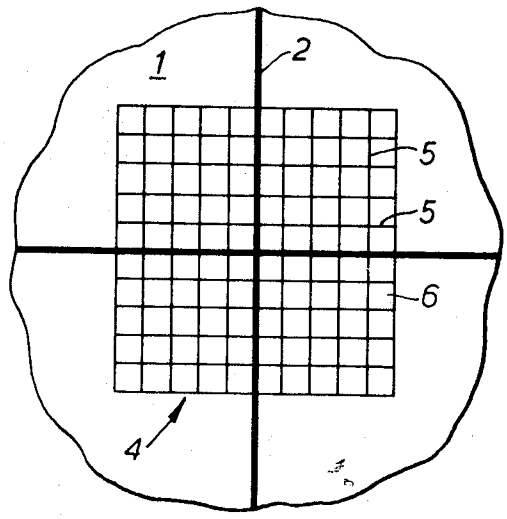
FIG. 2 is an enlarged view of a portion of the wafer shown in FIG. 1.

In FIG. 1 there is shown a surface of a wafer 1 of silicon (although other semiconductor materials, e.g., germanium and intermetallic semiconductors may be used) on which is defined a coarse grid 2 consisting of two orthogonal sets of parallel lines. This coarse reference grid 2 divides the surface of the wafer 1 into a number of square cells 3 and there is shown at 4 based on one of the cross-overs of the reference grid 2 a smaller reference grid of the same size as one of the cells 3. The wafer 1 may be prepared as follows: the surface of the wafer 1 is first oxidized and then coated with a layer of a positive working photo-resist; the reference grid 2 is then defined on the photo-resist by exposing the layer to ultra-violet light through a suitable mask; the photo-resist layer is then developed and the reference grid etched into the oxide layer on the surface of the wafer 1 in any suitable manner. (The oxide layer may be formed by any suitable technique e.g. thermal conversion or deposition or, instead, may be replaced by some other suitable protective layer, e.g., silicon nitride.) Typically the lines of the grid 2 are 3 microns wide and the cells 3 have a side of 0.25 centimeters. As the lines of the smaller reference grid 4 are required to be thinner than can be produced by optical techniques the oxidized wafer 1 is then coated with a positive working resist which is sensitive to electron beam bombardment. Although conventional positive working photoresists (e.g., KMER or Shipley AZ1350) may be used, it has been found preferable to use a suitable polymer, e.g., polymethylmethacrylate based resist of suitable viscosity which enables improved resolution to be obtained. More detailed information concerning such polymers appears in the IBM Journal, May 1968, page 251. The coated wafer is baked and then transferred to the worktable of an electron beam machine to be described subsequently. In this machine the intersection of two of the lines 2 of the reference grid is aligned with the path of the electron beam by means of an optical microscope provided on the machine, and when this has been done the electron beam is caused to trace out the smaller reference grid 4 in the resist; typically the lines 5 of the grid are 1 micron wide and define cells 6 having a side of 250 microns (FIG. 2). After tracing the electron beam to define the smaller grid 4 over the whole surface of the resist, the resist is treated with a suitable solvent or etchant so as to leave the smaller grid formed in the resist. The oxide coating on the wafer is then etched through the resist and then the wafer is etched through the oxide coating so that the smaller grid (corresponding to grid 4) is etched in the wafer itself. The oxide coating and the resist are then removed and a fresh oxide coating formed on the wafer thus leaving a permanent fine reference grid on the wafer which can readily be located by the apparatus to be described.

As explained previously the successive stages in the formation of a semiconductor device, such as an integrated circuit, having a plurality of elements must be accurately aligned with respect to one another so that the different regions of the device are correctly relatively disposed thereby enabling the production of elements having required characteristics to be produced. The smaller reference grid is provided for the purpose of monitoring the position of the electron beam on the wafer 1 so that successive exposures carried out of the machine are accurately aligned with one another. Although only one square of the smaller grid 4 is shown in FIGS. 1 and 2 it will be understood that the whole surface of the wafer 1 would in practice be covered by the lines of smaller reference grid, the process described above for forming the grid 4 based on one of the intersections of the reference grid 2 being carried out for all of the intersections of the grid 2.

Figure 3:
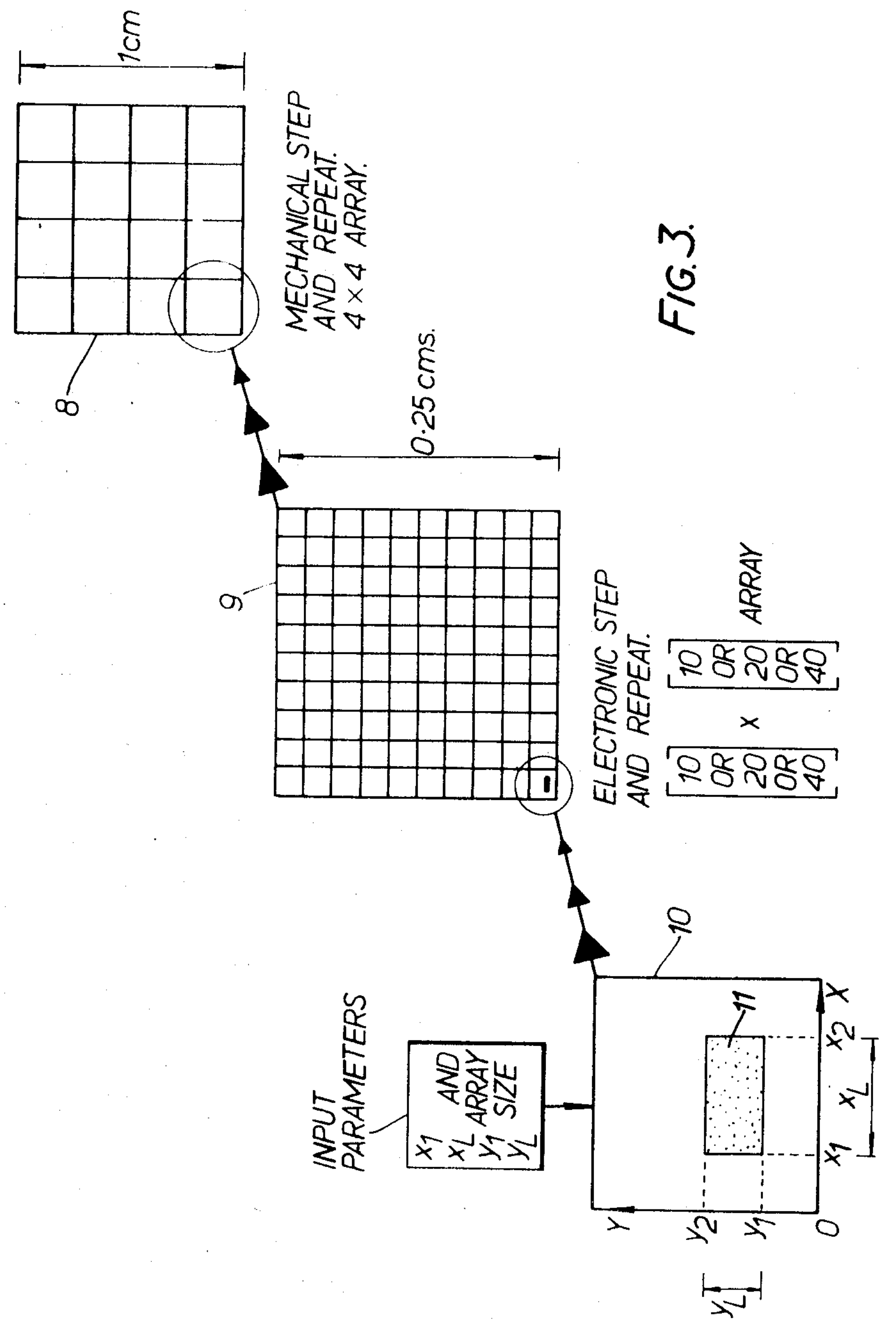
FIG. 3 is a diagram showing stages in a method of manufacture according to an example of the invention.

The wafer 1 is typically a slice of a silicon crystal and for this description a square of side 1 centimeter as shown at 8 in FIG. 3 on this slice is considered by way of example. Because of the accuracy required of the electron beam positioning and the fineness of the focus spot produced by the beam its deflection is limited to say 0.25 centimeters in both the X and Y directions so that the area which can be scanned by the electron beam is represented by the square 9 having a side 0.25 centimeters. As shown in FIG. 3 the square 9 is divided into 100 square cells each of which is to contain a similar semiconductor element of the type represented diagrammatically in the square 10. Without going into the detailed geometry of the various semiconductor elements which might be required to be produced in the cells, it is assumed that for a stage in the production of these elements a rectangular area 11 is required to be delineated, for example, for the purpose of doping that area of the semiconductor material of the cell 10. Rectangular areas can be combined to produce many shapes and, in fact, the vast majority of the shapes required for the manufacture of transistors and integrated circuits can be produced in this way. If non-rectangular shapes are required, then these may be produced by controlling the amplitude of the scan. In accordance with conventional semiconductor practice the surface of the wafer is covered by a film of oxide (or other suitable protective coating) which serves to prevent the dopant reaching the semiconductor material itself and in order to effect the selective doping required, it is required to etch away part of the oxide film. To carry out this etching the oxide film is covered with a resist sensitive to electron beam bombardment, e.g., a polymethylmethacrylate based resist, and the wafer placed in the electron beam machine to be described later. After alignment of the wafer, or rather alignment of the reference grids formed on the wafer, with predetermined positions of the electron beams, the electron beam is caused to scan a small raster which exactly fills the rectangle 11. The velocity of scanning and the energy of the beam are so chosen that the resist is effectively wholly exposed throughout the rectangle 11. Thereafter the exposed portion of resist can be selectively removed in the usual way using a solvent allowing the selective etching of the oxide uncovered by the resist and subsequent doping of the wafer.

If the wafer 1 had to be aligned with the electron beam separately for every cell of the square 9 the time required would be prohibitive, and therefore, the deflection of the electron beam is automatically controlled so that once the wafer has been accurately aligned the electron beam is caused to scan a succession of rectangles 11 one in each of the cells of the square 9. To achieve this automatic operation the electron beam machine is provided with a pattern generator controlled by a suitable record such as a punched paper tape bearing in coded form the length $X_L$ and height $Y_L$ of the rectangle 11 and the coordinates $X_1$, $Y_1$ of a reference apex of the rectangle 11. The successive values of the coordinates $X_1$, $Y_1$ depend on the spacing of the semiconductor elements to be produced and the pattern generator includes means for causing the electron beam to scan in succession all of the rectangles 11 within the square 9 without any control by the operator being required. When the electronic step and repeat or repeated step scanning as described above has been carried out over the whole of the square 9, the wafer 1 is shifted mechanically by moving the worktable so as to bring another square of the wafer under the electron beam and realigned. When this has been done the electronic repeated step operation is again carried out and so on until the entire surface of the wafer has been treated as required. It will be appreciated that the dimensions and numbers of lines at subdivisions shown in FIG. 3 are by way of example only and other dimensions and subdivisions could equally as well be used.

Figure 4:
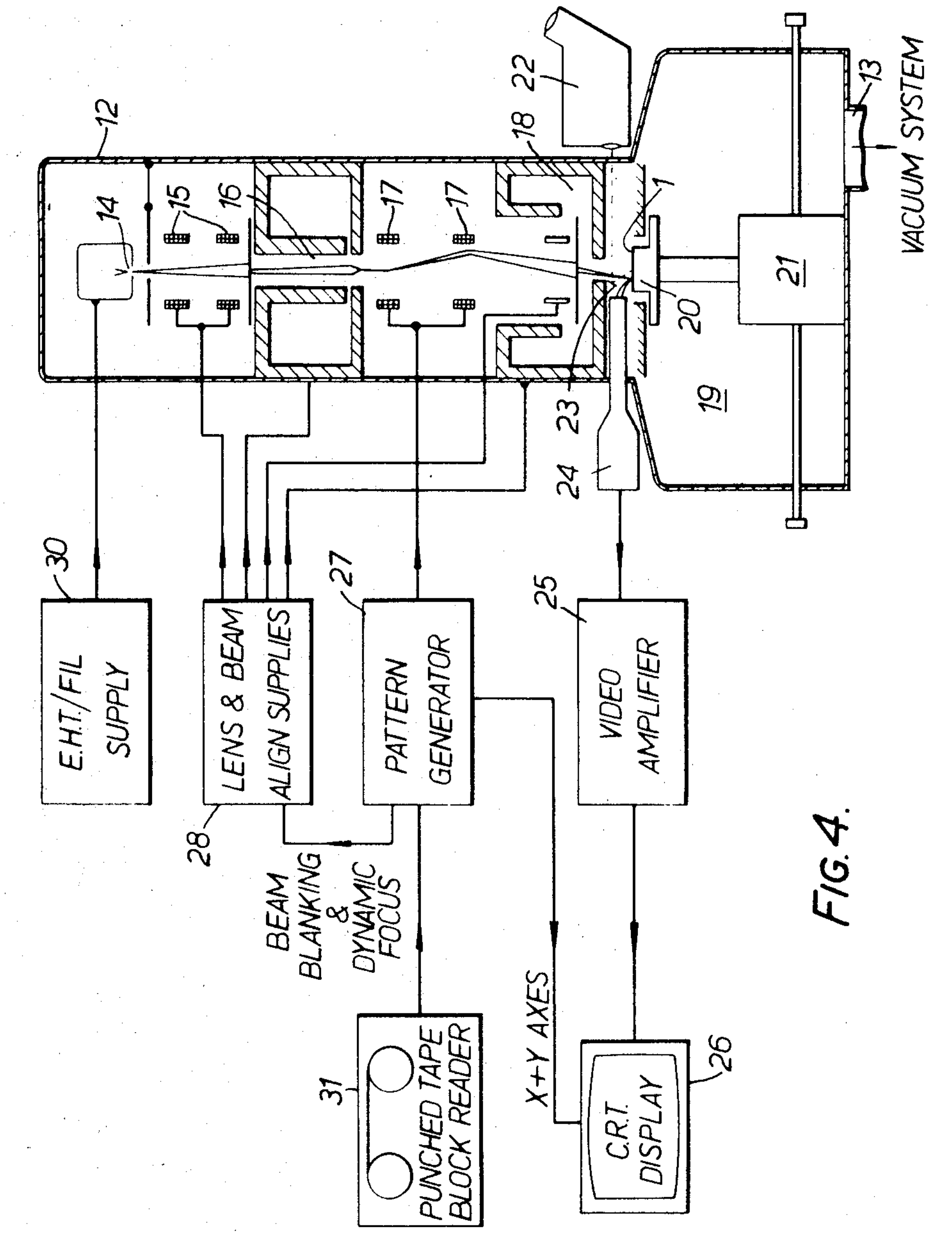
FIG. 4 is a diagram of one example of apparatus suitable for carrying out a method according to the invention.

FIG. 4 shows in diagrammatic form one example of an electron beam machine and control system suitable for carrying out the operations described above. The electron beam machine itself consists of a casing or envelope 12 coupled by the pipe 13 to a vacuum pump not shown. Within the envelope 12 there is provided an electron gun which may, for example, be thermionic, from which electrons pass aligning and blanking coils 15 to a magnetic condenser lens 16. From the condenser lens the beam passes through deflection coils 17 to a magnetic objections lens 18. In the work chamber 19 within the envelope 12 there is provided a worktable 20 on which the wafer 1 is placed. The worktable 20 is mounted on a suitable mechanical stage 21 which can be controlled from outside the envelope 12. The objective lens 18 serves to focus the electron beam onto the surface of the wafer 1. For the rough alignment of the wafer in the machine there is provided an optical microscope 22 through which the surface of the wafer 1 can be observed with the aid of the mirror 23. In order to obtain a video signal in response to the grid marks formed on the surface of the wafer 1 there is provided a single channel electron multiplier 24 which picks up the secondary electrons emitted from the surface of the wafer 1; as is well known from its use in a scanning electron microscope the secondary emission which takes place during the scanning of the electron beam over the surface varies in response to marks on the scanned surface. Thus there is produced from the multiplier 24 a video signal representing the surface marks on the wafer 1 which signal is applied to amplifier 25 and then to cathode-ray display tube 26. Pattern generator 27 provides X and Y deflection signals for the deflection coils 17 and also for the cathode-ray display tube 26, and also beam blanking signals and focus correction signals which are applied to the lens and beam alignment supply circuits 28. The circuits 28 provide the necessary currents and voltages for focussing the electron beam on the surface of the wafer 1, correcting astigmatism in the lenses, aligning the beam from the electron gun with the lenses and for blanking the beam. In view of the difficulty of turning off the beam quickly by means of a control electrode the beam blanking is effected by deflecting the beam away from the axis of the lens system so that it does not pass through an aperture in a lens but is cut off. Preferably the electron gun is arranged off the axis of the lens system so that light from the cathode cannot fall on the surface of the wafer 1 and cause photo-exposure of the resist; in addition, ions emitted from the cathode can also be prevented from reaching the wafer 1. Unit 30 provides the EHT filament supplies of the electron gun. Punched tape reader 31 is provided for applying in digital form signals to the pattern generator 27 to determine the deflection of the electron beam as described above.

The apparatus shown in FIG. 4 has two modes of operation, one during alignment and the second during exposure of the resist. During alignment the reference grids shown in FIGS. 1 and 2 which have previously been formed on the surface of the wafer 1 cause a video signal to be produced by the electron multiplier 24 which signal when displayed on the cathode-ray tube 26 can be arranged to show a magnified image of the grid, so that its alignment can be checked with marks provided on the screen of the cathode-ray tube. A more accurate method of alignment can, however, be used as shown in diagrammatic form in FIG. 5.

Figure 5:
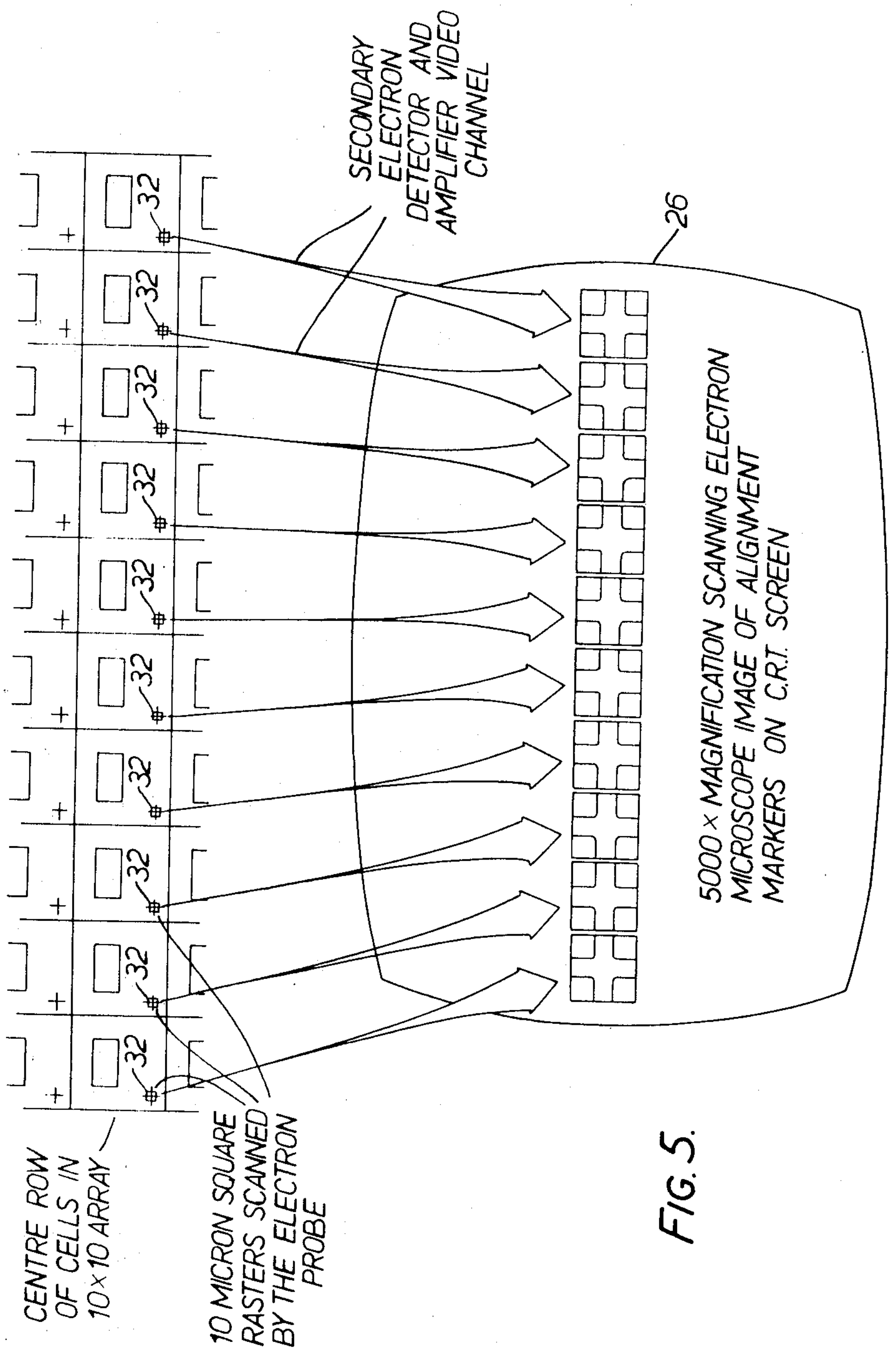
FIG. 5 is a diagram illustrating one example of an alignment technique.

FIG. 5 shows part of an array of semiconductor elements which may contain, for example, 100 elements in a 10 × 10 square array. In each of the 100 cells there is provided an alignment marker 32 delineated in the oxide coating or the semiconductor material itself in the form of a small cross located at a corner of the cell where it will not interfere with any processes on the semiconductor material. These crosses can conveniently be made when the small reference grid 4 is formed on the surface of the wafer 1 or they may be the intersections of the reference grid. When the wafer has been prepared for exposure to the electron beam, for example, by forming a film of oxide on the surface of the wafer and then applying to it a coating of electron sensitive resist, it is placed on the worktable 20 of the machine shown in FIG. 4 and aligned roughly using the optical microscope 22. Parameters are now fed from the paper tape reader 21 to the pattern generator 27 to cause the electron beam to scan 10 micron square areas centrally placed over the alignment marker crosses 32, that is to say, the crosses would be centrally placed in the rasters if the wafer is correctly aligned and the scan amplitude is correct. In this mode the pattern generator 27 is arranged to step in the X direction only and does not step in the Y direction so that only the center row of cells in the 10 × 10 array is scanned. The video signals produced by the multiplier 24 are applied to the cathode ray tube 26 to produce separate images of the 10 alignment marker crosses on the screen of the tube. The scanning of the display tube 26 is arranged so that the images of the 10 crosses are greatly magnified, for example, 1,000 to 5,000 times, but that the images appear closely side by side one another on the screen as shown in FIG. 5. When the alignment of the wafer is correct all ten crosses will appear centrally within the rasters on the screen of the cathode ray tube 26 and any departure from alignment will be immediately apparent. When alignment marker crosses are used, it is not necessary to mark out the coarse and fine grids described above.

As the area of resist over the alignment markers is exposed during the alignment process, it may be that the same marker cannot be used for a second alignment operation. To overcome this difficulty a number of alignment markers may be incorporated into the pattern, one for each alignment operation required.

Figures 6, 6A:
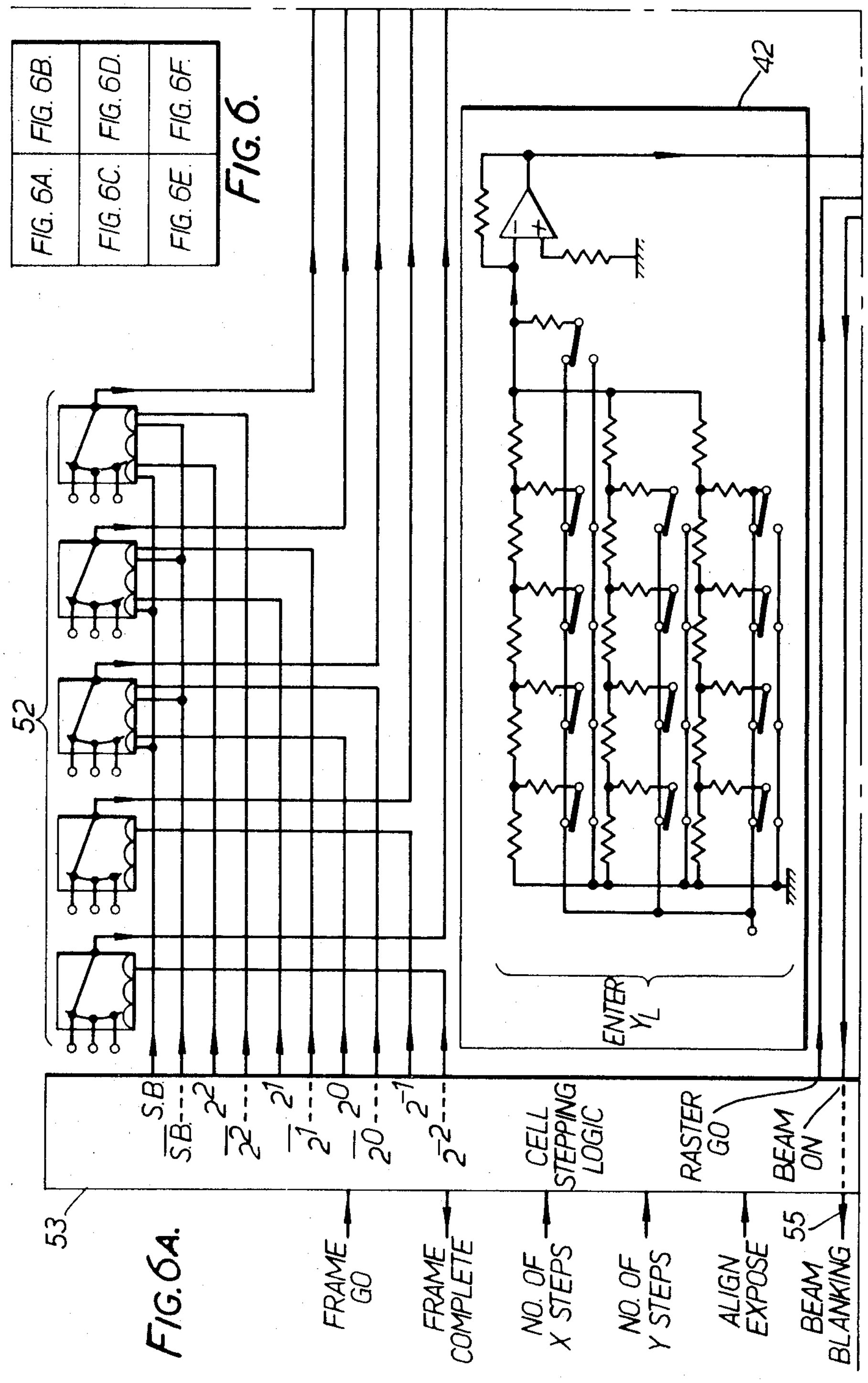
FIG. 6 (A to F) is a diagram of one example of pattern generator suitable for use in the apparatus of FIG. 4.
Figure 6B:
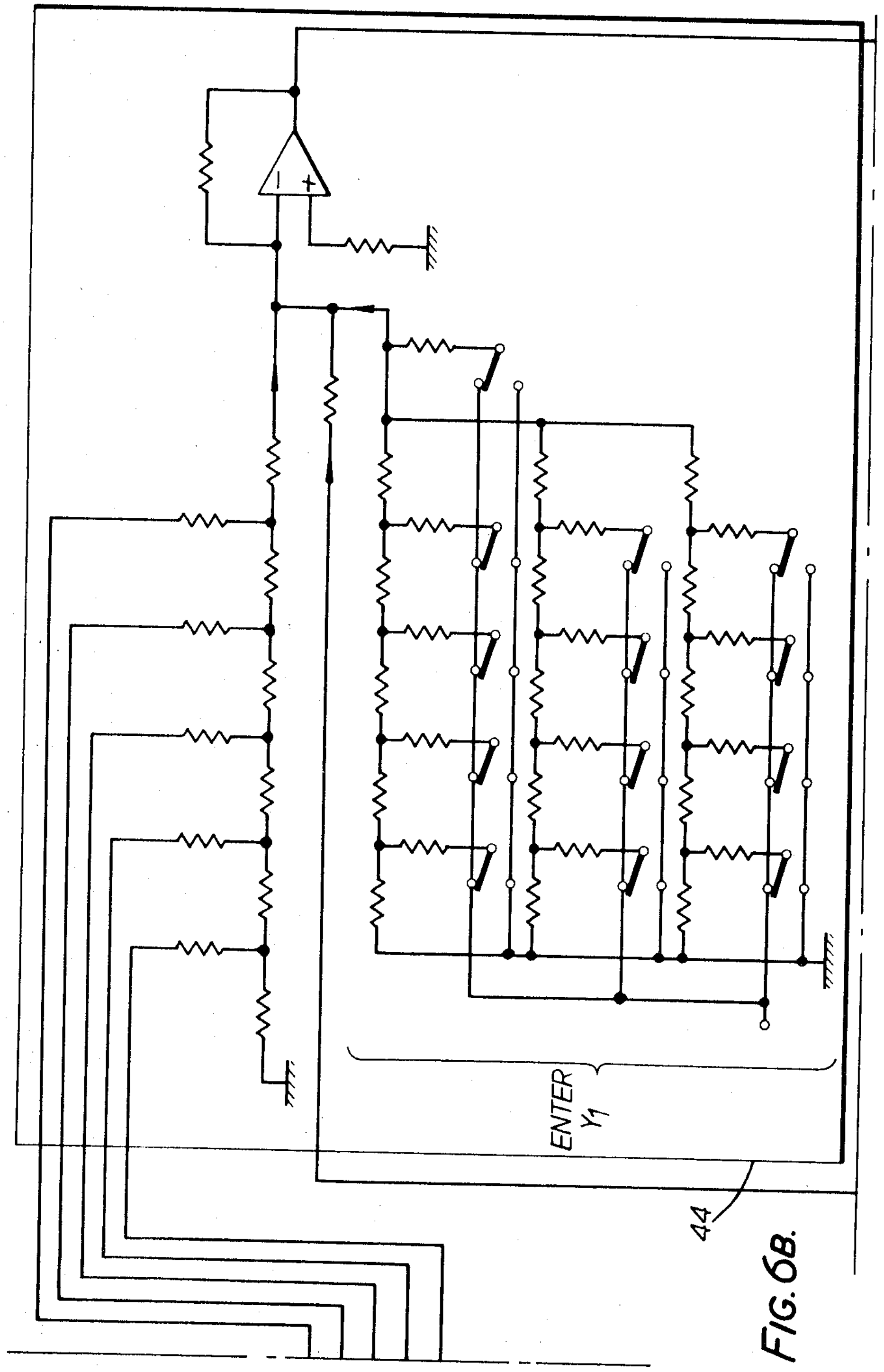
Figure 6C:
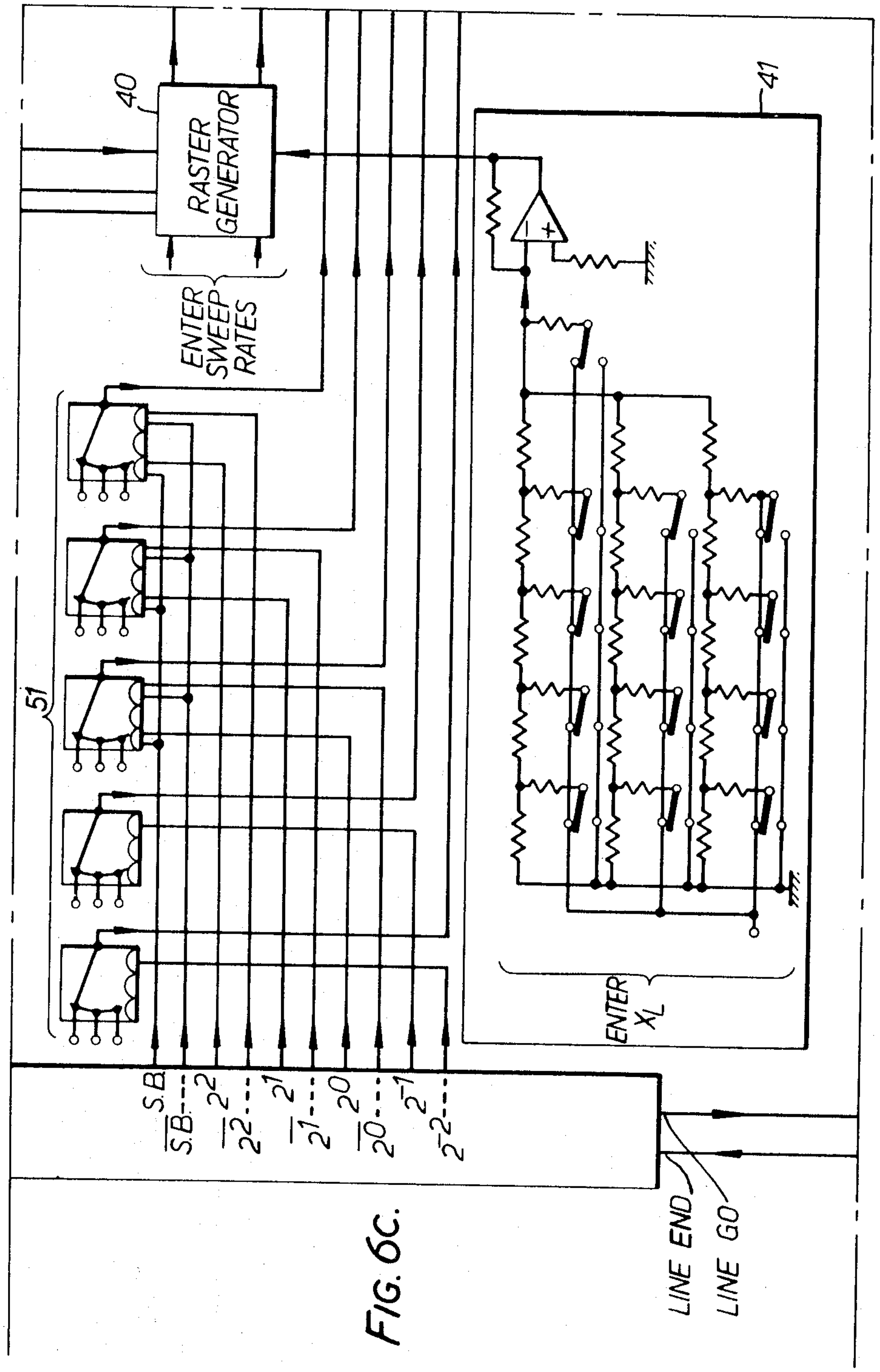
Figure 6D:
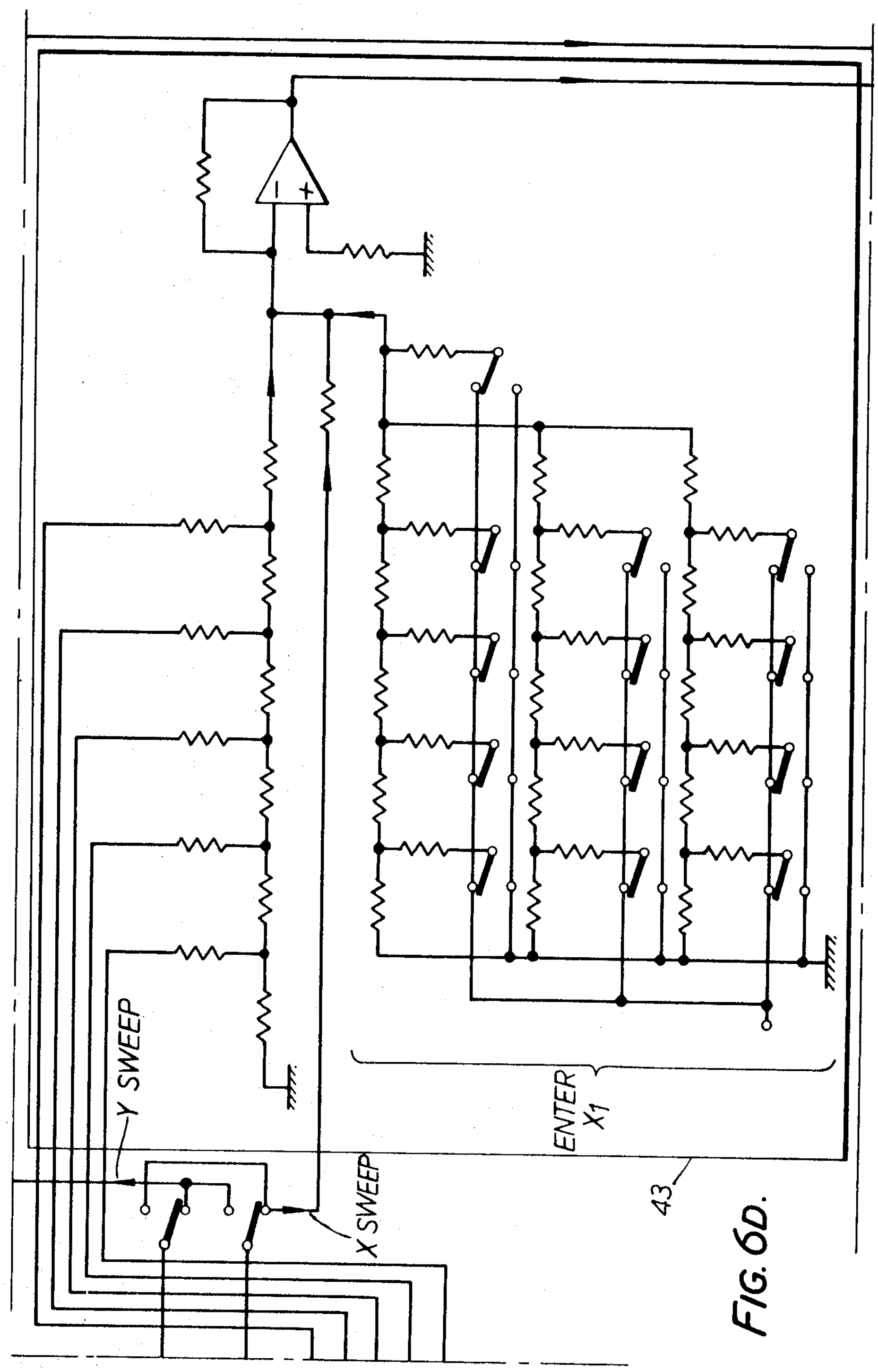
Figure 6E:
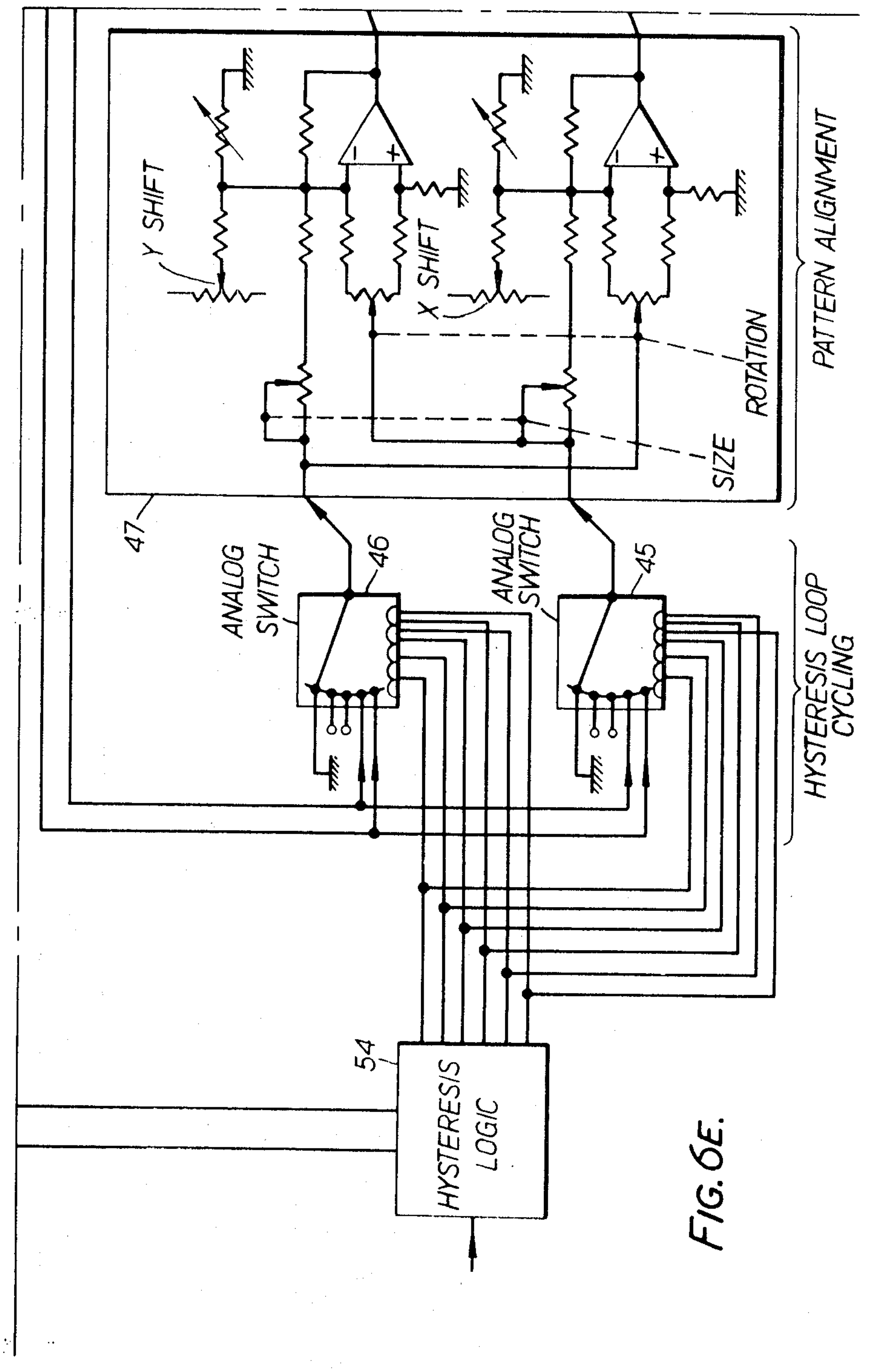
Figure 6F:
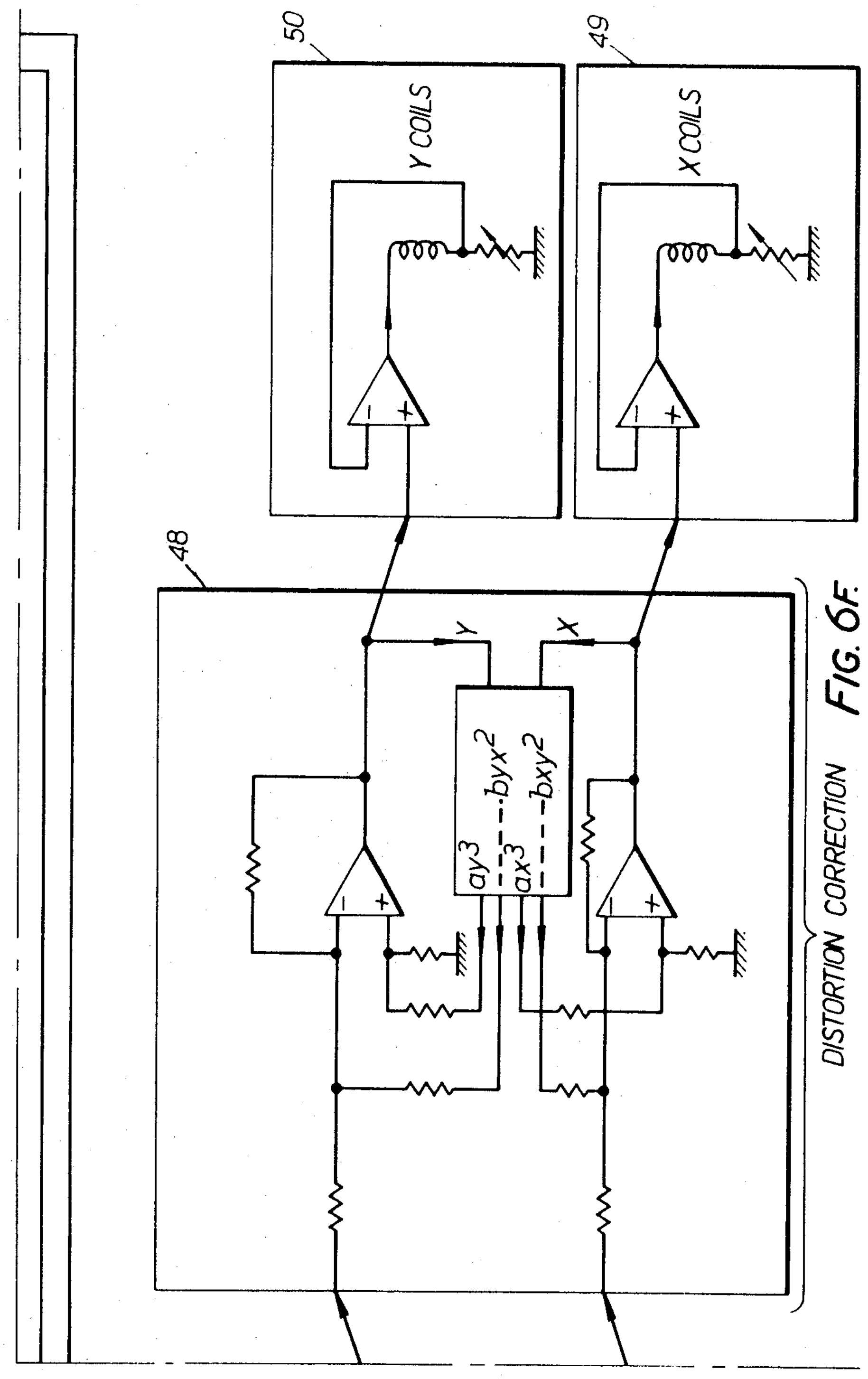

FIG. 6 (A to F) shows a suitable circuit arrangement for the pattern generator which produces the waveforms necessary to deflect the electron beam so as to describe the straight lines and rasters required. The raster generator 40 consists of a saw-tooth waveform generator and receives from digital to analogue converters 41 and 42, respectively, reference voltages representing $X_L$ and $Y_L$ which determine the amplitude of the X and Y scan waveforms respectively, and therefore, the width and height of the rectangle 11 (FIG. 3). The converters 41 and 42 consist of resistive ladder networks with switches set according to the digital input signals. The scanning waveforms of the generator 40 are applied to summing circuits 43 and 44, respectively, which fix the starting points for the waveforms. The summing circuits 43 and 44, which include conventional summing amplifiers, also have digital to analogue converters consisting of resistive ladder networks to which digital reference signals representing $X_1$ and $Y_1$ are respectively applied, so that the output signals of the summing circuits 43 and 44 can consist of saw-tooth waveforms starting from values representing $X_1$ and $Y_1$, and having amplitudes representing $X_L$ and $Y_L$, respectively; these waveforms are used to control the travel of the electron beam within the limits necessary for the generation of the small rasters used to produce the rectangle 11 (FIG. 3). The outputs of the circuits 43 and 44 are applied via analogue switches 45 and 46 to pattern alignment circuits 47 and from thence via distortion correction circuits 48 to output amplifiers driving the X and Y coils 49 and 50, respectively. The generator includes two sets of analogue switches 51 and 52 which provide the stepping for the X and Y cell intervals, this being pre-set. Unit 53 contains circuits necessary for performing the logic for driving the switches 51 and 52 so as to effect the stepping along the rows and columns of cells by the electron beam, during the stepping periods the electron beam is being blanked off. This stepping is also used to effect the electronic repeated scan referred to above with reference to FIG. 3.

The generator also includes a hysteresis logic unit 54 from which signals are applied to the switches 45 and 46 and thence to the X and Y scanning coils. The unit 54 is necessary as the magnetic yoke and coils used for deflecting the electron beam have magnetic hysteresis which cannot be neglected. Thus if patterns are described by the electron beam in a random manner a continuous drift of the zero position of the electron beam takes place. This effect is removed by the hysteresis logic circuit which ensures that the stepping signals are applied to the deflection coils in the correct sequence. Generally the analogue voltage switches 45 and 46 receive signals from the hysteresis logic circuit 54 so that both the X and Y deflection coils 49 and 50 are cycled through a complete hysteresis loop of constant magnitude every time there is a step in the Y direction.

The pattern alignment circuits 47 allow small changes to be made to the X and Y deflection waveforms. These changes can consist of any combination of three types: small shifts in the positive and negative directions, small changes in gain so that the pattern size can be adjusted by, for example ±0.5 percent, and a small amount of cross feed so as to introduce a small rotation, between ±0.01 radians, for example, into the X and Y axes of the scanning of the electron beam. These adjustments are brought out as four controls which are available to the operator, for example, in the form of 10 turn potentiometers. The central position of these controls is arranged so that the deflection waveforms pass unaltered through the pattern alignment circuits.

The distortion correction circuits 48 introduce a precise predetermined nonlinearity into the deflection waveforms which has been chosen so as exactly to cancel the nonlinearity in the deflection arising from the geometric shape of the magnetic deflection yokes and coils. Whilst not being essential to the operation of the pattern generation or the alignment of the deflection with the reference grid marked on the slice, because the nonlinearity will be constant and, therefore, common to all deflections of the beam, this distortion correction function ensures that the patterns produced by the electron beam machine are accurately rectangular.

The parameters $X_1$ and $Y_1$, $X_L$ and $Y_L$ referred to above with reference to FIG. 3 are applied to the pattern generator, either from the punched tape reader or as manual inputs, in the form of binary coded decimal signals representing voltages in the range from 0 – 1,999 volts with a resolution of 1mV. These signals are used to operate switches in the digital to analogue converters 41 and 42 to produce signals representing $X_L$ and $Y_L$ and operate switches in similar circuits in the summing circuits 43 and 44 to produce signals representing $X_1$ and $Y_1$.

Preferably the raster generator 40 is such that the extremes of the X and Y saw tooth waveforms are determined by comparison with reference voltages and not simply in dependence upon the characteristics of active elements which may change; in this way the desired accuracy in the delineation of the scanned areas can be obtained.

The X and Y sweep rates of the rasters produced by the generator 40 can be adjusted to give the required electronic exposure for the resist being used. As stated above the Y sweep rate is so chosen that successive sweeps in the X direction effectively overlap so that the entire area of a rectangle of the resist is subjected to electron exposure. Whilst new input signals are being applied to the pattern generator and during stepping from one cell to the next in both the X and Y directions, a signal is applied via conductor 55 to blank off the electron beam and thereby avoid any spurious lines being drawn on the resist by the electron beam.

The video signal derived in the example described above by the electron multiplier 24 from secondary electrons emitted by the wafer 1 under bombardment from the electron beam, can be produced in other ways. For example, both reference grids can be formed in the surface of the wafer 1 as lines of opposite conductivity type to that of the main body of the wafer 1. If the wafer 1 is of p-type silicon then a suitable dopant such as, for example, arsenic, can be diffused into the surface of the wafer 1 along the lines of the reference grid, arsenic being a particularly suitable dopant as it has a small diffusion co-efficient at the temperatures typically encountered during the production of semiconductor devices, and is, therefore, unaffected by subsequent diffusion processes to which the wafer may be subjected. After doping of the lines of the reference grid, contact areas such as 61 and 62 shown in FIG. 7 are formed on the wafer 1 by conventional techniques, being respectively connected to the main body of the wafer 1 and the n-type lines of the reference grid.

Figures 7, 8:
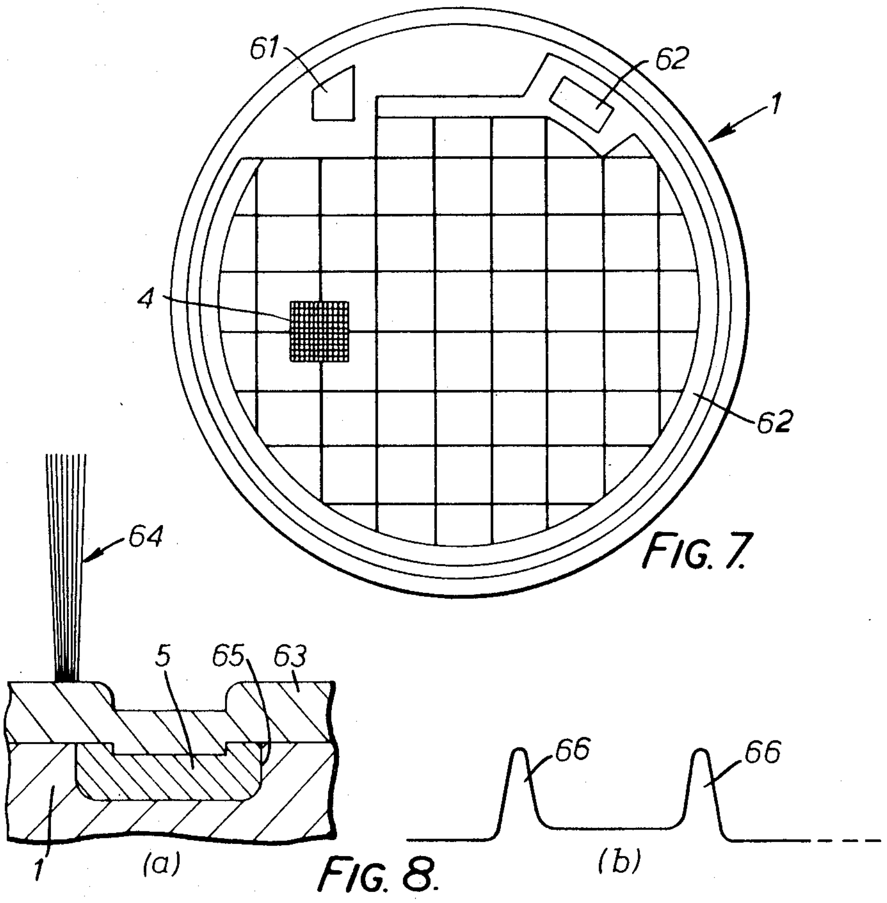
FIG. 7 shows the contact regions on the silicon wafer of FIGS. 1 and 2 required for the alignment of the wafer according to one of the methods described herein.
FIG. 8 shows the detection of an alignment grid according to this example.

FIG. 8 illustrates the use of the reference lines formed in this way as a means of obtaining a video signal from the wafer 1 in response to the electron beam. In FIG. **8*a* there is shown a cross-section of a portion of the surface of the wafer 1 showing the n-type material defining a line 5 of the grid 4 (FIGS. 1 and 2). The surface of the slice 1 is shown covered with film 63 of oxide and the electron beam is represented by reference 64. Before insertion into the electron beam machine connections are made to the contacts 61 and 62 (FIG. 7) and potentials applied thereto to reverse bias the pn junction 65 formed between the p-type body of the wafer 1 and the n-type material of the line 5 of the reference grid. If the electron beam 64 is not impinging on the oxide surface over one side or the other of the line 5, then there is substantially no reverse current across the pn junction. However, when the beam 64 falls over the junction at one side or the other of line 5 electron hole pairs are created in the depletion region at the junction causing reverse current of flow across the junction. This reverse current can be used as a video signal indicating the position of electron beam 64 relative to the lines 5 of the reference grid. As shown in FIG. 8***b* the reverse current across the junction will exhibit two peaks and when the electron beam is directly over the line 5 the reverse current will have the small valve shown in FIG. 8*b* between the pair of peaks 66.

Figure 9:
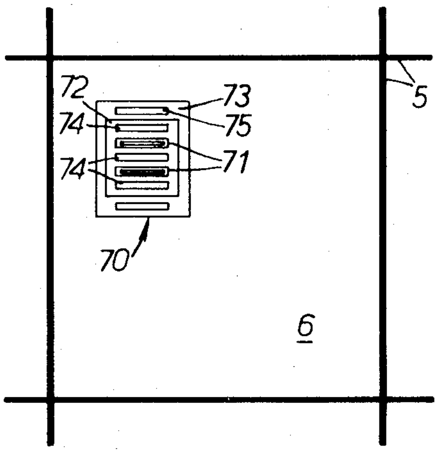
FIG. 9 shows one example of a transistor produced by a method according to the invention.

FIG. 9 shows, by way of example, one possible arrangement of a transistor which can be produced by a method according to the invention. It will be understood that the transistor is one of an array of such devices located in similar positions in each of the cells 6 defined by the lines 5 of the reference grid on the surface of the wafer 1, assumed to be p-type. The transistor 70 has rectangular emitter (N+), base (P) and collector (N) regions 71, 72 and 73 respectively, and base contact regions (P+) 74 and collector contact regions (N+) 75. The base and collector contact regions 74 and 75 are exposed through windows in the oxide layer covering the surface of the wafer which also defines contact windows 76 to the emitter regions 71. Each of these regions, and the contact windows in the oxide layer to the emitter, base and collector regions, has been delineated in the manner described above using an electron beam raster to define the necessary geometrical pattern in an electron sensitive coating on the oxide layer, followed by formation of correspondingly shaped apertures or windows in the oxide layer. In addition, the contacts to the emitter, base and collector regions can be defined utilizing electron beam raster scanning of an electron sensitive layer to define the required geometries of the metallized contacts. In the device just described, the lines 5 of the reference grid define squares of 100 microns; typical dimensions of the collector regions 73 are 25 microns × 30 microns and the emitter contact windows 76 are less than 1 micron wide. Although only a single semiconductor element is shown within this one cell 6 it will be appreciated that several such elements could be formed at the same time following the normal techniques of manufacture of integrated circuits. The invention is not restricted to the production of rectangular regions as the shape of the raster scanned by the beam can be controlled by varying $X_L$ and $Y_L$ to produce a region of any desired shape under the control of suitable stored digital information, for example. In order to achieve this result it would be necessary to replace the switches in the resistive networks of the digital to analogue converters 41 and 42 (FIG. 6) by transistor switches for example, to obtain sufficiently rapid operation.

What is claimed is:

1. A system for aligning a semiconductor slice having a selectively positioned reference alignment pattern and an electron-sensitive film thereon, by consecutively exposing a plurality of patterns in said electron-sensitive film, comprising:

a. means for generating an electron beam focused on said film b. electron beam deflection control means for sequentially step scanning the electron beam in an uninterrupted sequence over said electron-sensitive film in a pattern corresponding with said reference alignment pattern;

c. means responsive to said scanning of the electron beam to generate positional data signals corresponding to said scanned pattern and said alignment marker pattern;

d. means responsive to said positional data signals to generate error data indicating positional errors of said scanned patterns relative to said alignment marker pattern for enabling the said scanned patterns and said alignment marker pattern to be brought into alignment.

2. The system as set forth in claim 1: and including a. display means for simultaneously displaying images of a plurality of marks of said alignment marker pattern and of said scanned patterns; and b. manually operable means for controlling the said electron beam deflection means to align said scanned patterns relative to said alignment marker pattern.

3. A system as set forth in claim 2, wherein said display means is adapted to display magnified images of said plurality of alignment marks and of said scanned areas in a relatively closely spaced configuration thereby to emphasize any errors in alignment thereof.

4. A system as set forth in claim 1, including means for sequentially step scanning said electron beam in an uninterrupted sequence following said alignment step over a plurality of discrete rasters of the electron-sensitive film such that said discrete rasters are precisely positioned relative to said alignment marker pattern.

* * * * *